Aug. 28, 1956  H. L. MEREDITH  2,761,047
JOINING ALUMINUM AND ALUMINUM ALLOY TO
TITANIUM AND TITANIUM ALLOY
Filed Jan. 11, 1954
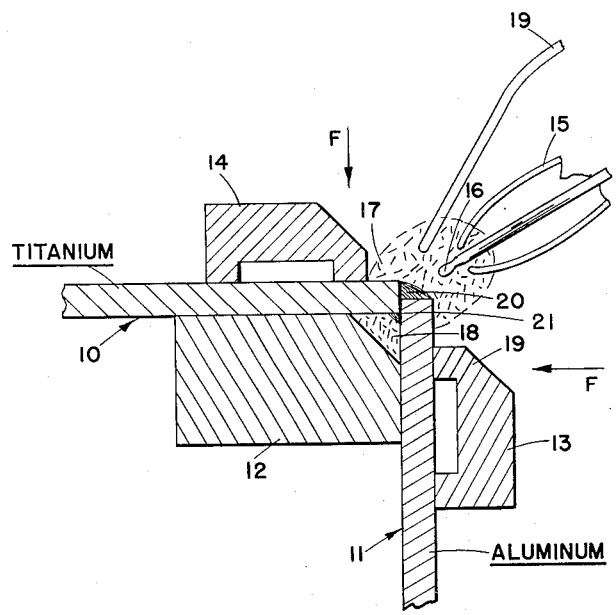
INVENTOR.
HARLAN L. MEREDITH
BY William P. Lane
ATTORNEY

2,761,047

JOINING ALUMINUM AND ALUMINUM ALLOY TO TITANIUM AND TITANIUM ALLOY

Harlan L. Meredith, Norwalk, Calif., assignor to North American Aviation, Inc.

Application January 11, 1954, Serial No. 403,181

5 Claims. (Cl. 219—10)

The present invention is concerned with the joining of aluminum and aluminum alloys to titanium and titanium alloys. The process of this invention is concerned primarily with the joining of such metals by a combined process of welding and brazing.

The problem of joining various metals to titanium is a difficult one. The presence, on a titanium surface of a tenacious oxide coating makes it difficult to join or weld various metals to the titanium by conventional processes. It has been found that the joining of two pieces of metal, one aluminum and the other titanium, can be accomplished by a combination of a brazing and a welding operation. Such brazing and welding is carried out using an alternating current high-frequency inert gas arc as the heating element.

The principal object of this invention is to provide a process of joining aluminum and its alloys to titanium and its alloys.

A further object of this invention is to provide a process of joining titanium to aluminum by means of a simultaneous welding and brazing process.

A still further object of this invention is to provide a process of joining aluminum and titanium in which a sound, high-strength joint is obtained.

Other objects and advantages of this invention will become apparent from the following description taken in connection with the accompanying single figure which is a representation of a typical weld which can be made using the instant procedural steps.

In the illustrated example, a titanium work piece 10 and an aluminum work piece 11 are to be joined. The work pieces are assembled in abutting relationship and are placed in a conventional type of jig or back-up support 12. A restraining pressure shown as F is applied on the surfaces of the two metals to prevent any buckling of the metals during the subsequent heating operation. Schematically shown element 13 represents a chilling bar usually of copper which is used with the disclosed apparatus to conduct excess heat away from the aluminum side of the abutting members. The chilling bar further functions to concentrate the heat at the weld zone by reason of the so-called "jamming" effect. This effect occurs generally at area 19 when the high conductivity bar 13 is conducting heat away at a maximum rate. Further heat thus is concentrated or "jammed" in the weld zone itself.

Schematically shown element 14 represents a positioning bar for holding the parts in relationship. An inert gaseous arc torch 15, having an electrode 16 of the consumable or non-consumable type, provides a heat source for the joining operation. The torch 15 emits an inert gas which envelops the area of joining and provides an atmosphere 17 of inert gas, preventing oxidation of the surfaces adjacent to the abutting parts of the titanium and aluminum. It is further important that the root portion of the weld be also protected from the detrimental effects of oxygen, hydrogen, nitrogen and other gaseous contaminants by providing an inert gaseous atmosphere 18 therearound.

In actual operation the inert gaseous arc torch acts to clean the surfaces of both the titanium and the aluminum. This cleaning action is best accomplished when the torch has a non-consumable electrode and is of the ultra-high-frequency alternating current type. An aluminum-base filler metal 19, generally in rod or wire form, is brought within the inert gas arc heating zone. By manipulation of the inert gas arc torch, the filler metal is added to the joint area of the aluminum work piece by welding and is added to the joint area of the titanium work piece by a brazing process. It can thus be seen that the temperature proximate to the aluminum side of the desired joint must be raised above the fusion temperature of the aluminum (1220° F.) in order to obtain a satisfactory weld. The temperature of the titanium surface adjacent the abutment is, of course, much less than the fusing temperature of titanium (3300° F.). A temperature in the range of 1250°–1400° F. at the metal surface adjacent the weld zone 20 is generally suitable to obtain satisfactory brazing of the aluminum-base filler metal to the titanium surface, and welding of the filler to the aluminum surface. The cleaning of the weld joint area by the alternating current arc insures a low surface tension in the vicinity of that area and enables the melted filler metal to easily flow over the titanium surface and into the root portion as at 21. It is to be understood that the aluminum filler portions which are welded to the aluminum area of the joint, and the filler portions which are brazed to the titanium portion of the joint are themselves integrally fused.

Various aluminum-base wire fillers have been found to be usable in the instant joining process. Particularly satisfactory is the 5–10 per cent silicon-aluminum alloy. Other aluminum-base fillers include silver-aluminum as well as pure aluminum.

The instant invention is not limited to the particular joint shown in the accompanying figure. Conventional butt weld, T welds, and lap welds may be fabricated using the steps of the disclosed process. It is to be understood that suitable inert gases include argon, helium, or mixtures thereof.

The combined welding and brazing procedure set out in the above description has been found to give satisfactory bonding of aluminum and its alloys to titanium and its various alloys. The resultant weld zone and adjacent area of the joint are both ductile and are of relatively high strength.

Although the invention has been described and illustrated in detail, it is to be clearly understood that the same is by way of illustration and example only and is not to be taken by way of limitation, the spirit and scope of this invention being limited only by the terms of the appended claims.

I claim:

1. The process of joining aluminum and its alloys to titanium and its alloys comprising the steps of placing the metals to be welded in abutting relationship, playing an inert gas heating arc over surface areas adjacent the abutment of said metals, heating said surface areas to a temperature above the fusion temperature of aluminum and below the fusion temperature of titanium with said arc, and adding an aluminum-base filler metal to the abutting joint edges whereby the filler metal is brazed to the titanium metal and welded to the aluminum metal.

2. The invention as set out in claim 1 in which the root portion of said abutting joint is protected by an inert gas atmosphere during the joining steps.

3. The invention as set out in claim 1 in which the inert gas heating arc is of the high-frequency alternating current type.

4. The process of joining aluminum and its alloys to titanium and its alloys comprising the steps of placing the metals to be welded in abutting relationship, heating the abutting edges of the metals to temperature above the melting point of aluminum and below the melting point of titanium, inert gas arc welding an aluminum-base filler metal portion to the aluminum metal at the abutting edges of the joint, and inert gas arc brazing an aluminum-base filler metal portion to the titanium metal at the abutting edges of the joint, said filler portions being integrally fused with each other to form a joint bond.

5. The invention as set out in claim 4 in which an inert gas atmosphere encloses the entire abutting surfaces of said metals.

References Cited in the file of this patent

UNITED STATES PATENTS

| | | |
|---|---|---|
| 1,469,043 | Laise | Sept. 25, 1923 |
| 1,886,643 | Chapman | Nov. 8, 1932 |
| 2,342,086 | Meredith | Feb. 15, 1944 |
| 2,405,542 | Wassell | Aug. 6, 1946 |
| 2,472,323 | Welch | June 7, 1949 |
| 2,475,357 | Miller | July 5, 1949 |
| 2,644,070 | Herbst | June 30, 1953 |
| 2,658,981 | Martin | Nov. 10, 1953 |